Patented May 15, 1923.

1,455,509

UNITED STATES PATENT OFFICE.

KARL RÜCKER, OF BERLIN-MARIENFELDE, GERMANY, ASSIGNOR, BY MESNE ASSIGNMENTS, TO THE CHEMICAL FOUNDATION, INC., A CORPORATION OF DELAWARE.

METHOD OF REFINING MIXTURES OF CHLORIDES OF NAPHTHALENES SERVING AS SUBSTITUTES FOR ROSIN.

No Drawing. Application filed November 14, 1918, Serial No. 262,628. Renewed February 9, 1923.

*To all whom it may concern:*

Be it known that I, Dr. KARL RÜCKER, a subject of the German Emperor, and resident of Berlin-Marienfelde, Germany, have invented new and useful Methods of Refining Mixtures of Chlorides of Naphthalenes Serving as Substitutes for Rosin (for which I have made application in Germany, Oct. 5, 1917), of which the following is a specification.

A new compound has been produced and placed on the market under the name of Perna to serve as a substitute for rosins and similar materials. It consists essentially of a mixture of chlorides of naphthalene and possesses to a remarkable degree the properties, which render it suitable as a substitute for rosin and the like. It was noticed in manufacturing this material that at a comparatively moderate heat vapors were given off which had very injurious effects on those employed in its manufacture. Eczemas are produced on the skin of those coming into contact with this material and the cure of such skin affections being a very tedious one, the manufacture was rendered practically impossible.

The present invention relates to a method of improving this material so that the essential part of the injurious constituents will have been removed before the material is manufactured. The present invention is based on the recognition of the fact that the injurious effect is produced by substances with a comparatively low boiling point which, when the material is heated, escape in the form of vapors, and the effect of which cannot be prevented by the best safety appliances known. In order to remove such constituents my process provides that the material shall be melted and heated to a temperature of 215° C. whereupon a current of air or indifferent gases is sent through the molten mass which removes the injurious substances that have been liberated by the heating. The product of this improving or refining method is a new substance, which has the same useful properties as the initial material, but with which the injurious effects will essentially not appear.

I claim:

1. Method of refining mixtures of chlorides of naphthalenes serving as substitutes for rosin, consisting in a current of air being sent through the said mixture after the same has been melted and heated to a temperature of 215° C.

2. Method of refining mixtures of chlorides of naphthalenes serving as substitutes for rosin, consisting in a current of indifferent gases being sent through the said mixture after the same has been melted and heated to a temperature of 215° C.

In testimony that I claim the foregoing as my invention, I have signed my name in presence of two witnesses, this twentieth day of September, 1918.

Dr. KARL RÜCKER.

Witnesses:
CARL ROTH,
CHARLOTTE BRABAND.